US012334005B2

(12) United States Patent
Lian et al.

(10) Patent No.: US 12,334,005 B2
(45) Date of Patent: Jun. 17, 2025

(54) DISPLAY DEVICE AND MURA COMPENSATION METHOD THEREOF

(71) Applicant: Novatek Microelectronics Corp., Hsinchu (TW)

(72) Inventors: Zi-Yi Lian, Miaoli County (TW); Yen-Tao Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 64 days.

(21) Appl. No.: 18/361,937

(22) Filed: Jul. 31, 2023

(65) Prior Publication Data

US 2025/0046240 A1 Feb. 6, 2025

(51) Int. Cl.
*G09G 3/3208* (2016.01)

(52) U.S. Cl.
CPC ..................... *G09G 3/3208* (2013.01); *G09G 2300/0819* (2013.01); *G09G 2320/0233* (2013.01); *G09G 2360/16* (2013.01)

(58) Field of Classification Search
None
See application file for complete search history.

(56) References Cited

U.S. PATENT DOCUMENTS 10,403,218 B2 9/2019 Zhao et al.
11,189,222 B1 * 11/2021 Aogaki ................ G09G 3/3208
11,210,982 B2 12/2021 Zheng et al.
2018/0075802 A1 * 3/2018 Liu ...................... G09G 3/3648
2018/0166003 A1 * 6/2018 Wang ........................ G06T 5/73
2018/0191371 A1 * 7/2018 Tao ......................... H03M 7/30
2018/0233096 A1 8/2018 Zhao et al.
2020/0013326 A1 1/2020 Zheng et al.
2020/0143726 A1 * 5/2020 Lv ............................ G09G 3/16
2021/0065633 A1 * 3/2021 Li ........................ G09G 3/3225

FOREIGN PATENT DOCUMENTS

CN 108538264 9/2018
CN 106898286 7/2020
CN 114822334 7/2022
CN 115035857 9/2022
WO 2017143669 8/2017

OTHER PUBLICATIONS

"Office Action of Taiwan Counterpart Application", issued on Jul. 4, 2024, p. 1-p. 7.

* cited by examiner

*Primary Examiner* — Christopher R Lamb
(74) *Attorney, Agent, or Firm* — JCIPRNET

(57) ABSTRACT

The invention provides a display device and a Mura compensation method thereof. The display device includes a display panel and a Mura compensation circuit. The Mura compensation circuit defines a compensation area in the display panel based on a curve equation corresponding to a current frame rate of the display panel. The Mura compensation circuit calculates a compensation weight in the compensation area based on the current frame rate and the curve equation. The Mura compensation circuit uses the compensation weight to compensate a pixel data in the compensation area so as to generate a compensated pixel data frame. The Mura compensation circuit provides the compensated pixel data frame to the display panel for displaying images.

28 Claims, 3 Drawing Sheets

DISPLAY DEVICE AND MURA COMPENSATION METHOD THEREOF

BACKGROUND

Technical Field

The disclosure relates to an electronic device, and in particular to a display device and a Mura compensation method thereof.

Description of Related Art

The Mura phenomenon on an organic light-emitting diode (OLED) panel is mainly due to the deviation of the OLED current caused by the uneven material properties of a thin-film transistor (TFT). Generally speaking, the Mura uneven phenomenon near the panel boundary is relatively serious. In the Mura compensation of the prior art, the Mura of the panel is mainly captured to quantify the information of the Mura into a value, and then the grayscale of the pixel is compensated according to the value. Such a method is defined as De-Mura (elimination of Mura). De-Mura needs to store a large amount of pixel data for compensation. Generally speaking, Mura may have different changes with different usage scenarios. For example, different frame refresh rates (frame rates) may have different Mura. The prior art needs to store different Mura compensation lookup tables corresponding to different frame refresh rates. Storing a large amount of compensation information for pixel compensation means increasing the manufacturing cost.

SUMMARY

The disclosure provides a display device and a Mura compensation method thereof to improve the Mura uniformity.

In an embodiment of the disclosure, the above-mentioned display device includes a display panel and a Mura compensation circuit. The Mura compensation circuit is coupled to the display panel. The Mura compensation circuit defines a first compensation area in the display panel based on a first curve equation corresponding to a current frame rate of the display panel. The Mura compensation circuit calculates at least one first compensation weight in the first compensation area based on the current frame rate and the first curve equation. The Mura compensation circuit uses the at least one first compensation weight to compensate at least one pixel data in the first compensation area, so as to generate a compensated pixel data frame. The Mura compensation circuit provides the compensated pixel data frame to the display panel for displaying images.

In an embodiment of the disclosure, the above-mentioned Mura compensation method includes: a first compensation area in a display panel is defined based on a first curve equation corresponding to a current frame rate of the display panel; at least one first compensation weight in the first compensation area is calculated based on the current frame rate and the first curve equation; at least one pixel data in the first compensation area is compensated by using the at least one first compensation weight, so as to generate a compensated pixel data frame; and the compensated pixel data frame is provided to the display panel for displaying images.

In an embodiment of the disclosure, the above-mentioned display device includes a display panel and a Mura compensation circuit. The Mura compensation circuit is coupled to the display panel. The Mura compensation circuit obtains a coefficient and an index value corresponding to a current frame rate of the display panel from a lookup table. The Mura compensation circuit calculates at least one compensation weight based on the coefficient and the index value. The Mura compensation circuit uses the at least one compensation weight to compensate at least one pixel data, so as to generate a compensated pixel data frame. The Mura compensation circuit provides the compensated pixel data frame to the display panel for displaying images.

In an embodiment of the disclosure, the above-mentioned Mura compensation method includes: a coefficient and an index value corresponding to a current frame rate of a display panel is obtained from a lookup table; at least one compensation weight is calculated based on the coefficient and the index value; at least one pixel data is compensated by using the at least one compensation weight, so as to generate a compensated pixel data frame; and the compensated pixel data frame is provided to the display panel for displaying images.

In an embodiment of the disclosure, the above-mentioned display device includes a display panel, a voltage supply circuit and a Mura compensation circuit. The voltage supply circuit is coupled to the display panel to provide an initialization voltage. The Mura compensation circuit is coupled to the display panel and the voltage supply circuit. In response to a current frame rate of the display panel changing from an original frame rate to a new frame rate, the Mura compensation circuit obtains a new voltage setting value corresponding to the new frame rate from a lookup table. The Mura compensation circuit controls the voltage supply circuit based on the new voltage setting value. The voltage supply circuit dynamically adjusts the initialization voltage based on the control of the Mura compensation circuit.

In an embodiment of the disclosure, the above-mentioned Mura compensation method includes: in response to a current frame rate of a display panel changing from an original frame rate to a new frame rate, a new voltage setting value corresponding to the new frame rate is obtained from a lookup table; and a voltage supply circuit is controlled based on the new voltage setting value, so as to dynamically adjust an initialization voltage to the display panel.

Based on the above, in some embodiments, the Mura compensation circuit may dynamically define the compensation area in the display panel based on the curve equation corresponding to the current frame rate, and then calculate the compensation weight in the compensation area based on the current frame rate and the curve equation. The Mura compensation circuit uses the compensation weight to compensate the pixel data in the compensation area, so as to generate a compensated pixel data frame to improve the Mura uniformity. In some other embodiments, the Mura compensation circuit obtains the coefficient and the index value from a lookup table based on the current frame rate, and then calculates the compensation weight based on the coefficient and the index value. The Mura compensation circuit uses the compensation weight to compensate the pixel data, so as to generate a compensated pixel data frame to improve the Mura uniformity. In yet some other embodiments, in response to the current frame rate of the display panel changing from the original frame rate to a new frame rate, the Mura compensation circuit obtains a new voltage setting value corresponding to the new frame rate from a lookup table. The Mura compensation circuit controls the voltage supply circuit based on the new voltage setting value and dynamically adjusts the initialization voltage of the pixel array of the display panel, so as to improve the Mura uniformity.

In order to make the aforementioned features and advantages of the disclosure comprehensible, embodiments accompanied with drawings are described in detail as follows.

DESCRIPTION OF THE EMBODIMENTS

Figure 1:
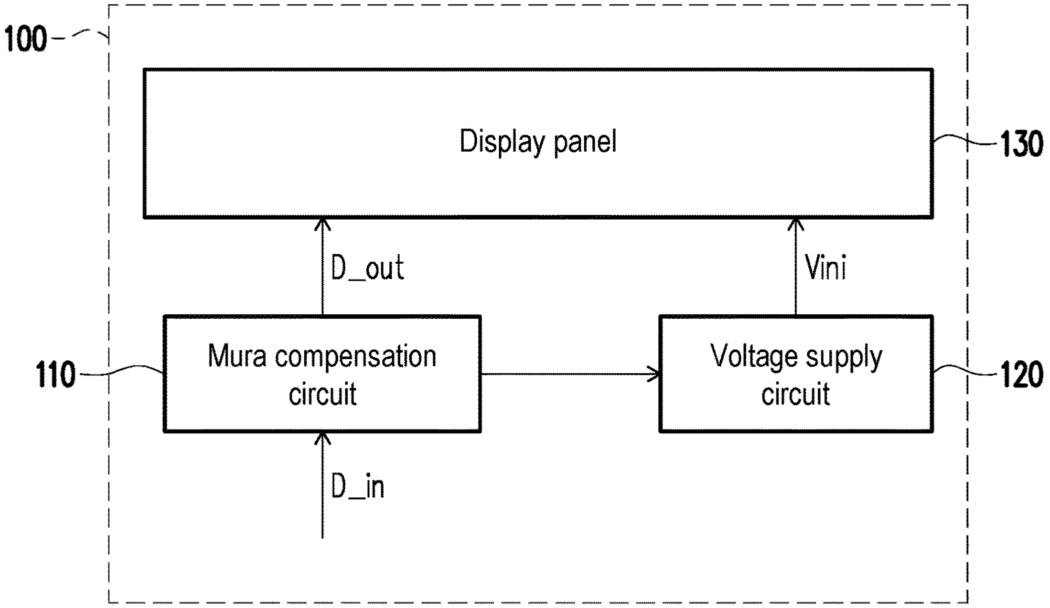
FIG. 1 is a schematic diagram of a circuit block of a display device according to an embodiment of the disclosure.

The term "coupled (or connected)" used in the specification (including the claims) may refer to any direct or indirect means of connection. For example, if that a first device is coupled (or connected) to a second device is described in the specification, the description should be construed that the first device may be directly connected to the second device, or the first device may be indirectly connected to the second device through other devices or some kind of connection means. The terms "first," "second" and the like mentioned in the specification (including the claims) are used to name the elements or to distinguish different embodiments or scopes and are not intended to limit the upper or lower limit of the number of the elements, nor are the terms intended to limit the order of the elements. In addition, wherever possible, elements/components/steps with the same reference numerals in the drawings and embodiments represent the same or similar parts. Elements/components/steps with the same reference numerals or with the same terminology in different embodiments may refer to relative descriptions of each other.

FIG. 1 is a schematic diagram of a circuit block of a display device 100 according to an embodiment of the disclosure. The display device 100 includes a Mura compensation circuit 110, a voltage supply circuit 120 and a display panel 130. The Mura compensation circuit 110 is coupled to the voltage supply circuit 120 and the display panel 130, and the voltage supply circuit 120 is further coupled to the display panel 130. Based on actual design, the display panel 130 may include an organic light-emitting diode (OLED) panel and/or other display panels.

The Mura compensation circuit 110 may compensate at least one pixel data in the compensation area of a pixel data frame D_in, so as to generate a compensated pixel data frame D_out. The Mura compensation circuit 110 may provide the compensated pixel data frame D_out to the display panel 130 for displaying images. According to different design, in some embodiments, the implementation manner of the Mura compensation circuit 110 may be a hardware circuit. In some other embodiments, the implementation manner of the Mura compensation circuit 110 may be firmware, software (i.e., a program), or a combination thereof. In yet some other embodiments, the implementation manner of the Mura compensation circuit 110 may be a combination of hardware, firmware and software.

In terms of hardware, the above-mentioned Mura compensation circuit 110 may be implemented as a logic circuit in an integrated circuit. For example, the related functions of the Mura compensation circuit 110 may be implemented in one or more controllers, microcontrollers, microprocessors, application-specific integrated circuits (ASICs), digital signal processors (DSPs), field programmable gate arrays (FPGAs), central processing units (CPUs) and/or various logic blocks, modules and circuits in other processing units. The related functions of the Mura compensation circuit 110 may be implemented as hardware circuits by using hardware description languages (such as Verilog HDL or VHDL) or other suitable programming languages, such as various logic blocks, modules and circuits in integrated circuits.

In terms of software and/or firmware, the above-mentioned related functions of the Mura compensation circuit 110 may be implemented as programming codes. For example, the Mura compensation circuit 110 is realized by using general programming languages (such as C, C++, or an assembly language) or other suitable programming languages. The programming code may be recorded/stored in a "non-transitory machine-readable storage medium". In some embodiments, the non-transitory machine-readable storage medium includes, for example, a semiconductor memory and/or a storage device. The semiconductor memory includes a memory card, a read only memory (ROM), a FLASH memory, a programmable logic circuit or other semiconductor memories. The storage device includes a tape, a disk, a hard disk drive (HDD), a solid-state drive (SSD), or other storage devices. An electronic device (such as a computer, a CPU, a controller, a microcontroller, or a microprocessor) may read and execute the programming code from the non-transitory machine-readable storage medium, thereby realizing the related functions of the Mura compensation circuit 110.

Figure 2:
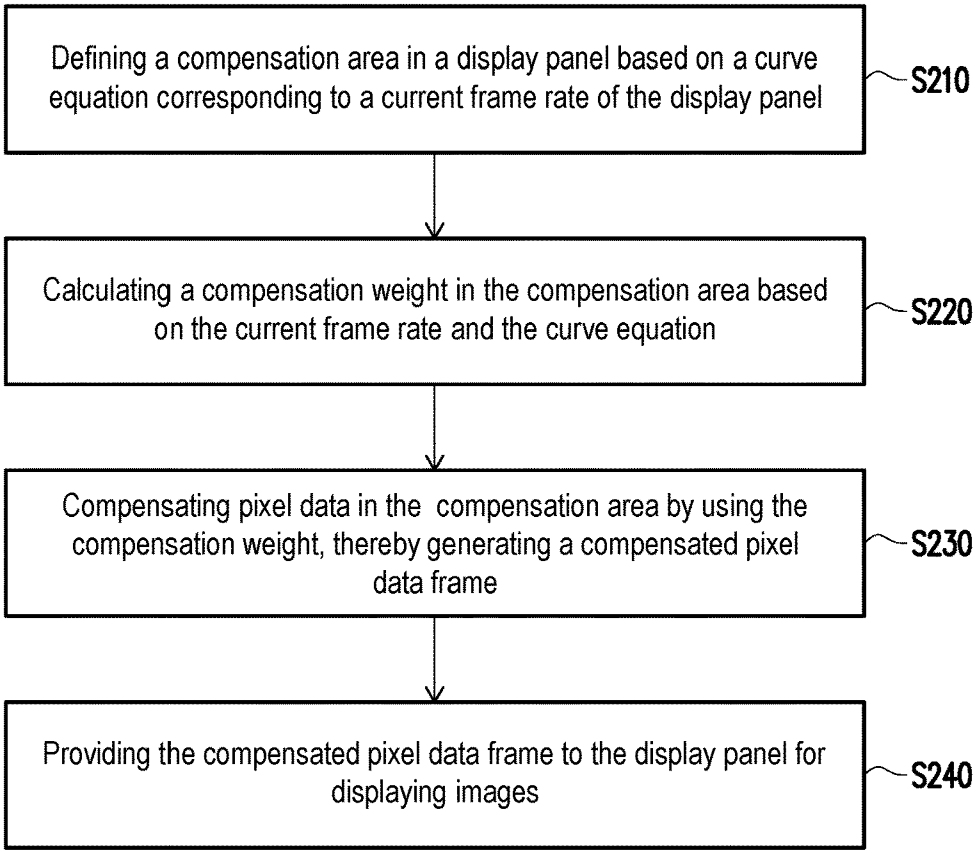
FIG. 2 is a schematic flowchart of a Mura compensation method according to an embodiment of the disclosure.

FIG. 2 is a schematic flowchart of a Mura compensation method according to an embodiment of the disclosure. Please refer to FIG. 1 and FIG. 2. In step S210, the Mura compensation circuit 110 defines a compensation area in the display panel 130 based on a curve equation corresponding to a current frame rate of the display panel 130. Different frame rates have different curve equations. The curve equations may be prepared in advance in an offline manner. For example, when the display panel 130 is at a certain frame rate, a test machine captures the Mura of the display panel 130 to distinguish an area (compensation area) where the Mura uneven phenomenon is relatively serious from the entire display area of the display panel 130, thereby determining the curve equation according to the area where the Mura uneven phenomenon is relatively serious. By analogy, when the display panel 130 is at another frame rate, the test machine captures the Mura of the display panel 130 to determine another curve equation according to the area where the Mura uneven phenomenon is relatively serious. Therefore, different curve equations corresponding to different frame rates may be prepared in advance in an offline manner. The prior art needs to store different Mura compensation lookup tables corresponding to different frame rates. Compared with the amount of data of the Mura compensation lookup table, the amount of data of the curve equation is quite small.

Figure 3:
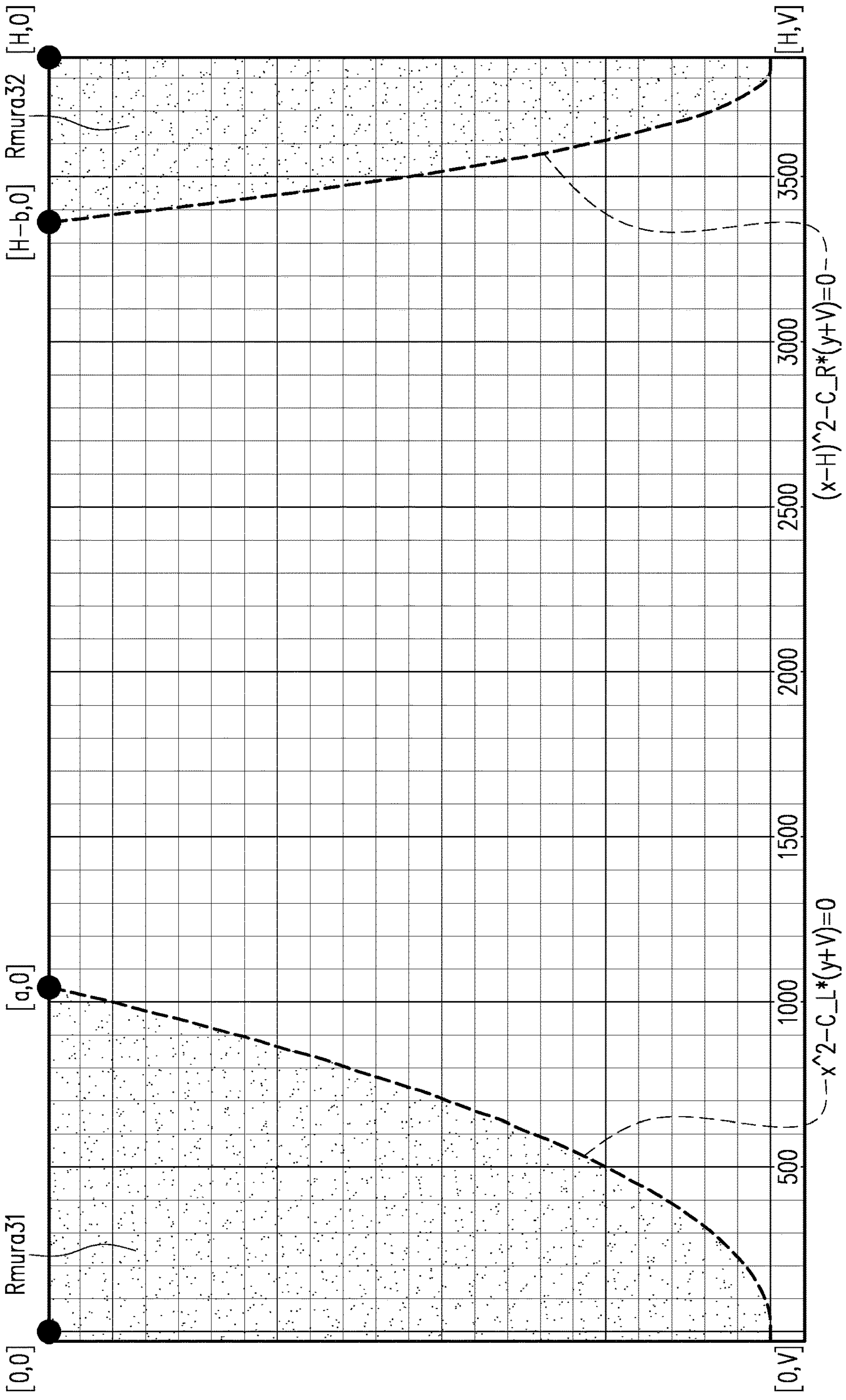
FIG. 3 is a schematic diagram of an area (compensation area) where the Mura uneven phenomenon of the display panel is relatively serious according to an embodiment of the disclosure.

FIG. 3 is a schematic diagram of an area (compensation area) where the Mura uneven phenomenon of the display panel 130 is relatively serious according to an embodiment of the disclosure. The pixel coordinates of the four corners of the display panel 130 are [0,0], [H,0], [0,V] and [H,V] respectively. When the display panel 130 is at a certain frame rate (the current frame rate), the areas where the Mura uneven phenomenon of the display panel 130 are relatively serious include compensation areas Rmura31 and Rmura32 shown in FIG. 3. The equation x=0, the equation y=0 and the curve equation x^2−C_L*(y+V)=0 define the compensation area Rmura31 of the display panel 130, and the equation x=H, the equation y=0 and the curve equation (x−H)^2−C_R*(y+V)=0 define the compensation area Rmura32 of the display panel 130. Moreover, C_L and C_R are coefficients.

The test machine may capture the Mura of the display panel 130. The Mura compensation circuit 110 may distinguish the areas where the Mura uneven phenomenon are relatively serious (the compensation areas Rmura31 and Rmura32) from the entire display area of the display panel 130 based on the grayscale threshold (index value), thereby determining the curve equation x^2−C_L*(y+V)=0 and the curve equation (x−H)^2−C_R*(y+V)=0 according to the areas where the Mura uneven phenomenon are relatively serious. The grayscale threshold (index value) may be any real number determined according to actual design. The Mura compensation circuit 110 may calculate the coefficients C_L and C_R of the curve equations based on a compensation data frame and an index value I corresponding to the current frame rate, and record the current frame rate, the coefficient C_L and the coefficient C_R in a lookup table. Table 1 below is one of many examples of lookup tables.

TABLE 1

One of many examples of lookup tables

| Frame rate | Vini | C_L | C_R | I |
|---|---|---|---|---|
| 30 | 4.2 | L30 | R30 | I30 |
| 45 | 4 | L45 | R45 | I45 |
| 75 | 3.6 | L75 | R75 | I75 |
| 90 | 3.5 | L90 | R90 | I90 |

A calculation example of the coefficients C_L and C_R is described here. When the display panel 130 is at a certain reference frame rate (for example, 120 Hz or other frame rates), the test machine may capture the display panel 130 to calculate a compensation data frame applicable to the reference frame rate. The calculation of the compensation data frame may be any De-Mura (elimination of Mura) algorithm, such as the known De-Mura algorithm or other De-Mura algorithms. Similarly, when the display panel 130 is at any frame rate (such as 30 Hz, 45 Hz, 75 Hz, 90 Hz, or other frame rates), the test machine may capture the display panel 130 to calculate the compensation data frames applicable to different frame rates.

The current frame rate is assumed to be 30 Hz, the index value I corresponding to the current frame rate of 30 Hz is assumed to be 130, a pixel compensation data in a compensation data frame C1 corresponding to the current frame rate of 30 Hz is assumed to be C1[x,y](the coordinates in the compensation data frame C1 are [x,y]), and a corresponding pixel compensation data in a compensation data frame C2 corresponding to the reference frame rate (such as 120 Hz or other frame rates) is assumed to be C2[x,y](the coordinates in the compensation data frame C2 are [x,y]). The Mura compensation circuit 110 calculates a ratio R1[x,y] of C1[x, y] to C2[x,y], so as to generate the ratio frame R1 corresponding to the current frame rate of 30 Hz. The Mura compensation circuit 110 compares the index value 130 with all ratios in the ratio frame R1 and determines geometric parameters of the compensation areas Rmura31 and Rmura32. The Mura compensation circuit 110 calculates the coefficients C_L and C_R of the curve equations based on the geometric parameters and the index value 130. Suppose the coefficients C_L and C_R corresponding to the current frame rate of 30 Hz are L30 and R30 respectively, the Mura compensation circuit 110 may record the current frame rate of 30 Hz, the coefficient L30, the coefficient R30 and the index value 130 in the above Table 1 (lookup table).

Taking the compensation area Rmura31 as an example, the curve equation is x^2−C_L*(y+V)=0. The Mura compensation circuit 110 may calculate C_L=(a^2)/V, where C_L is the coefficient of the curve equation x^2−C_L*(y+V)=0, a is the geometric parameter of the compensation area Rmura31 (a is the upper boundary length of the compensation area Rmura31) and V is the vertical resolution of the display panel 130. Taking the compensation area Rmura32 as an example, the curve equation is (x−H)^2−C_R*(y+V)=0. The Mura compensation circuit 110 may calculate C_R=(b^2)/V, where C_R is the coefficient of the curve equation (x−H)^2−C_R*(y+V)=0, b is the geometric parameter of the compensation area Rmura32 (b is the upper boundary length of the compensation area Rmura32), V is the vertical resolution of the display panel 130 and H is the horizontal resolution of the display panel 130.

For other frame rates (such as 45 Hz, 75 Hz, 90 Hz, or other frame rates), reference may be made to the relevant description of the frame rate of 30 Hz and analogies may further be made, and thus details are not repeated here. The Mura compensation circuit 110 may record the frame rate of 45 Hz, coefficient L45, coefficient R45 and index value 145 in the above Table 1, record the frame rate of 75 Hz, coefficient L75, coefficient R75 and index value 175 in the above Table 1 and record the frame rate of 90 Hz, coefficient L90, coefficient R90 and index value I90 in the above Table 1.

Referring to FIG. 1 and FIG. 2, the Mura compensation circuit 110 may obtain the coefficient C_L, the coefficient C_R and the index value I from a lookup table (such as the above Table 1) based on the current frame rate. For example, suppose the current frame rate is 90 Hz, the Mura compensation circuit 110 may obtain the coefficient C_L, the coefficient C_R and the index value I from Table 1 as "L90", "R90" and "I90" respectively based on the current frame rate "90 Hz", and then obtain the curve equation x^2−L90*(y+V)=0 of the compensation area Rmura31 and the curve equation (x−H)^2−R90*(y+V)=0 of the compensation area Rmura32.

In step S220, based on the current frame rate, the curve equation x^2−C_L*(y+V)=0 and the curve equation (x−H)^2−C_R*(y+V)=0, the Mura compensation circuit 110 may calculate the compensation weight in the compensation area Rmura31 and the compensation weight in the compensation area Rmura32. In step S230, the Mura compensation circuit 110 may use the compensation weight of the compensation area Rmura31 to compensate at least one pixel data in the compensation area Rmura31 of the pixel data frame D_in, and use the compensation weight of the compensation area Rmura32 to compensate at least one pixel data in the compensation area Rmura32, so as to generate the compensated pixel data frame D_out. In step S240, the Mura compensation circuit 110 may provide the compensated pixel data frame D_out to the display panel 130 for displaying images.

In response to the current frame rate changing from the original frame rate to a new frame rate, the Mura compensation circuit 110 may obtain a new coefficient C_L, a new coefficient C_R and a new index value I corresponding to the new frame rate from a lookup table (such as the above Table 1). The Mura compensation circuit 110 may update the curve equation $x^2-C_L*(y+V)=0$ and the curve equation $(x-H)^2-C_R*(y+V)=0$ based on the new coefficients C_L and C_R. The Mura compensation circuit 110 may use the new index value I and the new curve equations to calculate the compensation weight in the compensation area Rmura31 and the compensation weight in the compensation area Rmura32. The Mura compensation circuit 110 may use the compensation weight of the compensation area Rmura31 to compensate the pixel data in the compensation area Rmura31, and use the compensation weight of the compensation area Rmura32 to compensate the pixel data in the compensation area Rmura32.

For example, the curve equation of the compensation area Rmura31 is $x^2-C_L*(y+V)=0$, and the Mura compensation circuit 110 may calculate $W=1+(x^2-C_L*(y+V))*I/C_V$, where W is the compensation weight of the compensation area Rmura31, C_L is the new coefficient of the curve equation of the compensation area Rmura31, V is the vertical resolution of the display panel 130, I is the new index value and C_V is a real coefficient related to the vertical resolution V. The curve equation of the compensation area Rmura32 is $(x-H)^2-C_R*(y+V)=0$, and the Mura compensation circuit 110 may calculate $W=1+((x-H)^2-C_R*(y+V))*I/C_V$, where W is the compensation weight of the compensation area Rmura32, H is the horizontal resolution of the display panel 130, C_R is the new coefficient of the curve equation of the compensation area Rmura32, V is the vertical resolution of the display panel 130, I is the new index value and C_V is a real coefficient related to the vertical resolution V.

In the embodiment shown in FIG. 1, the voltage supply circuit 120 is coupled to the display panel 130 to provide an initialization voltage Vini. The initialization voltage Vini is configured to initialize the pixel array of the display panel 130 in the reset phase. In response to the current frame rate changing from the original frame rate to a new frame rate, the Mura compensation circuit 110 may obtain a new voltage setting value corresponding to the new frame rate from the field of the initialization voltage Vini of a lookup table (such as the above Table 1). The Mura compensation circuit 110 may control the voltage supply circuit 120 based on the new voltage setting value, and the voltage supply circuit 120 may dynamically adjust the initialization voltage Vini based on the control of the Mura compensation circuit 110.

To sum up, the Mura compensation circuit 110 may obtain the coefficients C_L and C_R from a lookup table (such as the above Table 1) based on the current frame rate. The Mura compensation circuit 110 may dynamically define the compensation area Rmura31 of the display panel 130 based on the curve equation $x^2-C_L*(y+V)=0$ corresponding to the current frame rate, and dynamically define the compensation area Rmura32 of the display panel 130 based on the curve equation $(x-H)^2-C_R*(y+V)=0$ corresponding to the current frame rate. The Mura compensation circuit 110 may calculate the compensation weight in the compensation area Rmura31 based on the current frame rate and the curve equation $x^2-C_L*(y+V)=0$, and calculate the compensation weight in compensation area Rmura32 based on the current frame rate and the curve equation $(x-H)^2-C_R*(y+V)=0$. The Mura compensation circuit 110 may use the compensation weight of the compensation area Rmura31 to compensate the pixel data in the compensation area Rmura31, and use the compensation weight of the compensation area Rmura32 to compensate the pixel data in the compensation area Rmura32, so as to generate the compensated pixel data frame D_out to improve the Mura uniformity.

Figure 4:
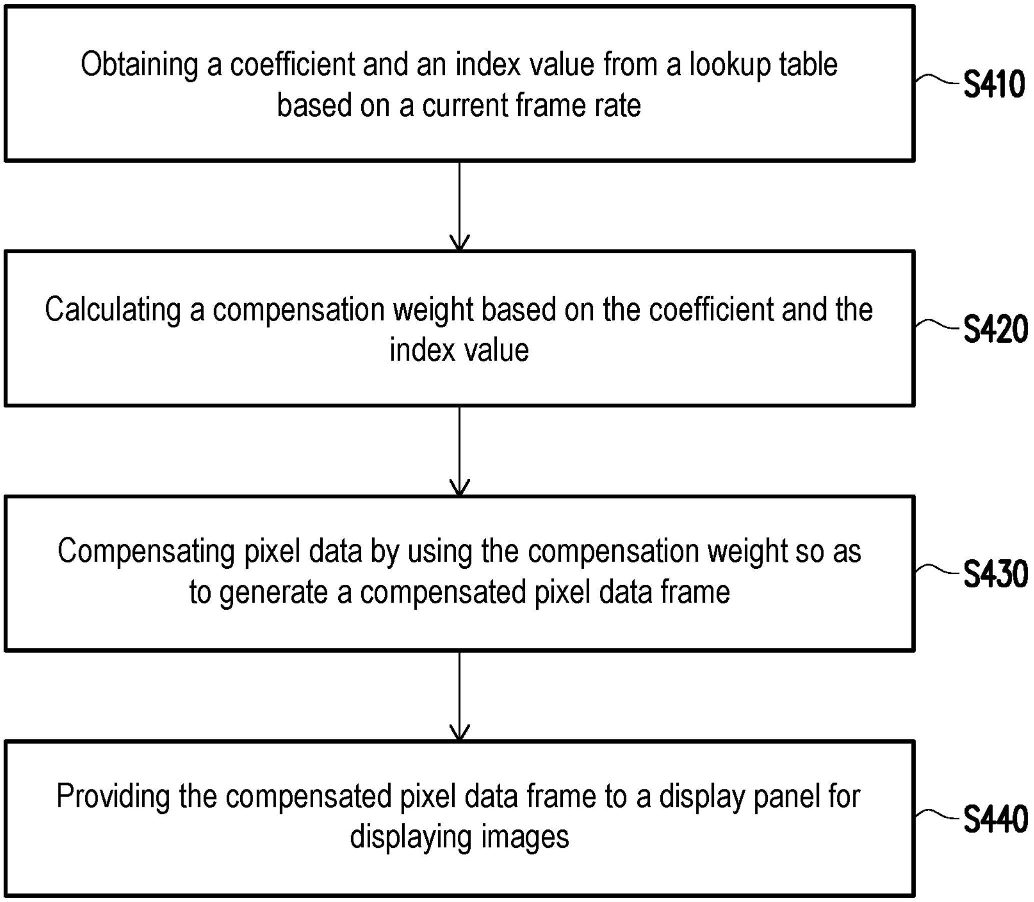
FIG. 4 is a schematic flowchart of a Mura compensation method according to another embodiment of the disclosure.

FIG. 4 is a schematic flowchart of a Mura compensation method according to another embodiment of the disclosure. Please refer to FIG. 1 and FIG. 4. In step S410, the Mura compensation circuit 110 obtains a coefficient C_L, a coefficient C_R and an index value I corresponding to a current frame rate of the display panel 130 from a lookup table (such as the above Table 1). In step S420, the Mura compensation circuit 110 calculates at least one compensation weight based on the coefficient C_L, the coefficient C_R and the index value I. In step S430, the Mura compensation circuit 110 uses the compensation weight to compensate the pixel data, so as to generate a compensated pixel data frame D_out. In step S440, the Mura compensation circuit 110 provides the compensated pixel data frame D_out to the display panel 130 for displaying images.

For example, the curve equation of the compensation area Rmura31 is $x^2-C_L*(y+V)=0$. Please refer to FIG. 1 and FIG. 3. The Mura compensation circuit 110 may calculate $W=1+(x^2-C_L*(y+V))*I/C_V$, where W is the compensation weight of the compensation area Rmura31, C_L is the coefficient of the curve equation of the compensation area Rmura31, V is the vertical resolution of the display panel 130, I is the index value, and C_V is a real coefficient related to the vertical resolution V. The curve equation of the compensation area Rmura32 is $(x-H)^2-C_R*(y+V)=0$, and the Mura compensation circuit 110 may calculate $W=1+((x-H)^2-C_R*(y+V))*I/C_V$, where W is the compensation weight of the compensation area Rmura32, H is the horizontal resolution of the display panel 130, C_R is the coefficient of the curve equation of the compensation area Rmura32, V is the vertical resolution of the display panel 130, I is the index value and C_V is a real coefficient related to the vertical resolution V.

To sum up, the Mura compensation circuit 110 may obtain the coefficient C_L, the coefficient C_R and the index value from a lookup table (such as the above Table 1) based on the current frame rate, and then calculate the compensation weight in the compensation area Rmura31 and the compensation weight in the compensation area Rmura32 based on the coefficients and the index value. The Mura compensation circuit 110 may use the compensation weight of the compensation area Rmura31 to compensate the pixel data in the compensation area Rmura31, and use the compensation weight of the compensation area Rmura32 to compensate the pixel data in the compensation area Rmura32, so as to generate the compensated pixel data frame D_out to improve the Mura uniformity.

Figure 5:
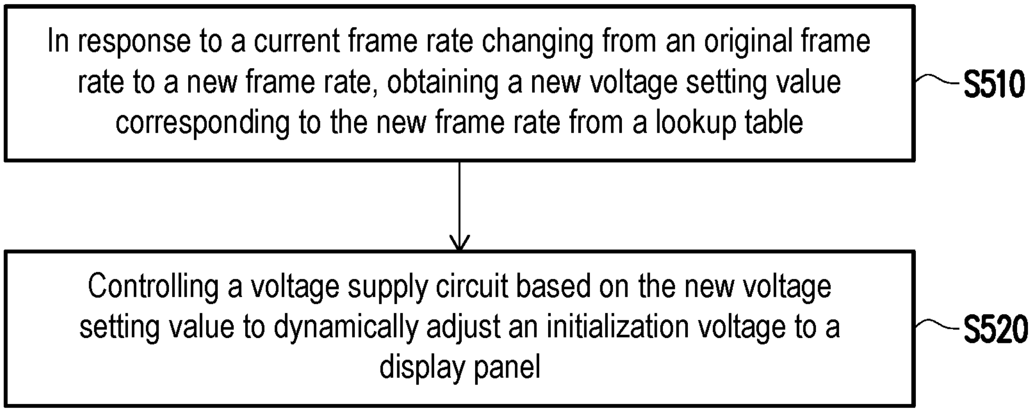
FIG. 5 is a schematic flowchart of a Mura compensation method according to yet another embodiment of the disclosure.

FIG. 5 is a schematic flowchart of a Mura compensation method according to yet another embodiment of the disclosure. Referring to FIG. 1 and FIG. 5, the Mura compensation circuit 110 is coupled to the display panel 130 and the voltage supply circuit 120. In step S510, in response to the current frame rate of the display panel 130 changing from the original frame rate to a new frame rate, the Mura compensation circuit 110 may obtain a new voltage setting value corresponding to the new frame rate from the field of the initialization voltage Vini of a lookup table (such as the above Table 1). In step S520, the Mura compensation circuit 110 may control the voltage supply circuit 120 based on the new voltage setting value, and the voltage supply circuit 120 dynamically adjusts the initialization voltage Vini based on the control of the Mura compensation circuit 110.

To sum up, in response to the current frame rate of the display panel 130 changing from the original frame rate to a new frame rate, the Mura compensation circuit 110 may obtain a new voltage setting value corresponding to the new frame rate from a lookup table (such as the above Table 1). The Mura compensation circuit 110 may control the voltage supply circuit 120 based on the new voltage setting value to dynamically adjust the initialization voltage Vini of the pixel array of the display panel 130, thereby improving the Mura uniformity.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A display device, comprising:

a display panel; and a Mura compensation circuit, coupled to the display panel, wherein the Mura compensation circuit defines a first compensation area in the display panel based on a first curve equation corresponding to a current frame rate of the display panel, the Mura compensation circuit calculates at least one first compensation weight in the first compensation area based on the current frame rate and the first curve equation, the Mura compensation circuit uses the at least one first compensation weight to compensate at least one pixel data in the first compensation area so as to generate a compensated pixel data frame, and the Mura compensation circuit provides the compensated pixel data frame to the display panel for displaying images, wherein in response to the current frame rate changing from an original frame rate to a new frame rate, the Mura compensation circuit obtains a new coefficient and a new index value corresponding to the new frame rate from a look-up table, the Mura compensation circuit updates the first curve equation based on the new coefficient, the Mura compensation circuit uses the new index value and the first curve equation to calculate the at least one first compensation weight in the first compensation area, and the Mura compensation circuit uses the at least one first compensation weight to compensate the at least one pixel data in the first compensation area.

2. The display device according to claim 1, wherein the Mura compensation circuit further defines a second compensation area in the display panel based on a second curve equation, the Mura compensation circuit calculates at least one second compensation weight in the second compensation area based on the current frame rate and the second curve equation, and the Mura compensation circuit uses the at least one second compensation weight to compensate at least one pixel data in the second compensation area.

3. The display device according to claim 1, wherein the Mura compensation circuit calculates a coefficient of the first curve equation based on a first compensation data frame and an index value corresponding to the current frame rate, and records the current frame rate and the coefficient into the look-up table.

4. The display device according to claim 3, wherein a second compensation data frame corresponds to a reference frame rate, the Mura compensation circuit calculates a ratio of any pixel compensation data in the first compensation data frame to a corresponding pixel compensation data in the second compensation data frame so as to generate a ratio frame corresponding to the current frame rate, the Mura compensation circuit compares the index value with all ratios in the ratio frame to determine at least one geometric parameter of the first compensation area, and the Mura compensation circuit calculates the coefficient of the first curve equation based on the at least one geometric parameter and the index value.

5. The display device according to claim 4, wherein the first curve equation is x^2−C_L*(y+V)=0, and the Mura compensation circuit calculates C_L=(a^2)/V, wherein C_L is the coefficient of the first curve equation, a is the at least one geometric parameter of the first compensation area, a is an upper boundary length of the first compensation area, and V is a vertical resolution of the display panel.

6. The display device according to claim 4, wherein the first curve equation is (x−H)^2−C_R*(y+V)=0, and the Mura compensation circuit calculates C_R=(b^2)/V, wherein C_R is the coefficient of the first curve equation, b is the at least one geometric parameter of the first compensation area, b is an upper boundary length of the first compensation area, V is a vertical resolution of the display panel, and H is a horizontal resolution of the display panel.

7. The display device according to claim 1, wherein the first curve equation is x^2−C_L*(y+V)=0, and the Mura compensation circuit calculates W=1+(x^2−C_L*(y+V))*I/C_V, wherein W is the first compensation weight, C_L is the new coefficient of the first curve equation, V is a vertical resolution of the display panel, I is the new index value, and C_V is a real coefficient related to the vertical resolution.

8. The display device according to claim 1, wherein the first curve equation is (x−H)^2−C_R*(y+V)=0, and the Mura compensation circuit calculates W=1+((x−H)^2−C_R*(y+V))*I/C_V, wherein W is the first compensation weight, H is a horizontal resolution of the display panel, C_R is the new coefficient of the first curve equation, V is a vertical resolution of the display panel, I is the new index value, and C_V is a real coefficient related to the vertical resolution.

9. The display device according to claim 1, further comprising:

a voltage supply circuit, coupled to the display panel to provide an initialization voltage;

wherein in response to the current frame rate changing from the original frame rate to the new frame rate, the Mura compensation circuit obtains a new voltage setting value corresponding to the new frame rate from the look-up table, the Mura compensation circuit controls the voltage supply circuit based on the new voltage setting value, and the voltage supply circuit dynamically adjusts the initialization voltage based on the control of the Mura compensation circuit.

10. An Mura compensation method, comprising:

defining a first compensation area in a display panel based on a first curve equation corresponding to a current frame rate of the display panel;

calculating at least one first compensation weight in the first compensation area based on the current frame rate and the first curve equation;

compensating at least one pixel data in the first compensation area by using the at least one first compensation weight so as to generate a compensated pixel data frame;

providing the compensated pixel data frame to the display panel for displaying images;

in response to the current frame rate changing from an original frame rate to a new frame rate, obtaining a new coefficient and a new index value corresponding to the new frame rate from a look-up table;

updating the first curve equation based on the new coefficient;

calculating the at least one first compensation weight in the first compensation area by using the new index value and the first curve equation; and compensating the at least one pixel data in the first compensation area by using the at least one first compensation weight.

11. The Mura compensation method according to claim 10, further comprising:

defining a second compensation area in the display panel based on a second curve equation;

calculating at least one second compensation weight in the second compensation area based on the current frame rate and the second curve equation; and compensating at least one pixel data in the second compensation area by using the at least one second compensation weight.

12. The Mura compensation method according to claim 10, further comprising:

calculating a coefficient of the first curve equation based on a first compensation data frame and an index value corresponding to the current frame rate; and recording the current frame rate and the coefficient into the look-up table.

13. The Mura compensation method according to claim 12, wherein a second compensation data frame corresponds to a reference frame rate, and the Mura compensation method further comprises:

calculating a ratio of any pixel compensation data in the first compensation data frame to a corresponding pixel compensation data in the second compensation data frame so as to generate a ratio frame corresponding to the current frame rate;

comparing the index value with all ratios in the ratio frame to determine at least one geometric parameter of the first compensation area; and calculating the coefficient of the first curve equation based on the at least one geometric parameter and the index value.

14. The Mura compensation method according to claim 13, wherein the first curve equation is $x^2-C_L*(y+V)=0$, and the Mura compensation method further comprises:

calculating $C_L=(a^2)/V$, wherein $C_L$ is the coefficient of the first curve equation, a is the at least one geometric parameter of the first compensation area, a is an upper boundary length of the first compensation area, and V is a vertical resolution of the display panel.

15. The Mura compensation method according to claim 13, wherein the first curve equation is $(x-H)^2-C_R*(y+V)=0$, and the Mura compensation method further comprises:

calculating $C_R=(b^2)/V$, wherein $C_R$ is the coefficient of the first curve equation, b is the at least one geometric parameter of the first compensation area, b is an upper boundary length of the first compensation area, V is a vertical resolution of the display panel, and H is a horizontal resolution of the display panel.

16. The Mura compensation method according to claim 10, wherein the first curve equation is $x^2-C_L*(y+V)=0$, and the Mura compensation method further comprises:

calculating $W=1+(x^2-C_L*(y+V))*I/C_V$, wherein W is the first compensation weight, $C_L$ is the new coefficient of the first curve equation, V is a vertical resolution of the display panel, I is the new index value, and $C_V$ is a real coefficient related to the vertical resolution.

17. The Mura compensation method according to claim 10, wherein the first curve equation is $(x-H)^2-C_R*(y+V)=0$, and the Mura compensation method further comprises:

calculating $W=1+((x-H)^2-C_R*(y+V))*I/C_V$, wherein W is the first compensation weight, H is a horizontal resolution of the display panel, $C_R$ is the new coefficient of the first curve equation, V is a vertical resolution of the display panel, I is the new index value, and $C_V$ is a real coefficient related to the vertical resolution.

18. The Mura compensation method according to claim 10, further comprising:

in response to the current frame rate changing from the original frame rate to the new frame rate, obtaining a new voltage setting value corresponding to the new frame rate from the look-up table; and controlling a voltage supply circuit based on the new voltage setting value, so as to dynamically adjust an initialization voltage to the display panel.

19. A display device, comprising:

a display panel; and a Mura compensation circuit, coupled to the display panel, wherein the Mura compensation circuit obtains a coefficient and an index value corresponding to a current frame rate of the display panel from a look-up table, the Mura compensation circuit calculates at least one compensation weight based on the coefficient and the index value, the Mura compensation circuit uses the at least one compensation weight to compensate at least one pixel data so as to generate a compensated pixel data frame, and the Mura compensation circuit provides the compensated pixel data frame to the display panel for displaying images, wherein the Mura compensation circuit defines a first compensation area in the display panel based on a first curve equation corresponding to the current frame rate of the display panel, and wherein in response to the current frame rate changing from an original frame rate to a new frame rate, the Mura compensation circuit obtains a new coefficient and a new index value corresponding to the new frame rate from the look-up table, the Mura compensation circuit updates the first curve equation based on the new coefficient, the Mura compensation circuit uses the new index value and the first curve equation to calculate the at least one compensation weight in the first compensation area, and the Mura compensation circuit uses the at least one compensation weight to compensate the at least one pixel data in the first compensation area.

20. The display device according to claim 19, wherein the Mura compensation circuit calculates $W=1+(x^2-C_L*(y+V))*I/C_V$, wherein W is the first compensation weight, $C_L$ is the new coefficient of the first curve equation, V is a vertical resolution of the display panel, I is the new index value, and $C_V$ is a real coefficient related to the vertical resolution.

21. The display device according to claim 19, wherein the Mura compensation circuit calculates $W=1+((x-H)^2-C_R*(y+V))*I/C_V$, wherein W is the first compensation weight, H is a horizontal resolution of the display panel, $C_R$ is the new coefficient of the first curve equation, V is a vertical resolution of the display panel, I is the new index value, and C_V is a real coefficient related to the vertical resolution.

22. The display device according to claim 19, further comprising:

a voltage supply circuit, coupled to the display panel to provide an initialization voltage;

wherein in response to the current frame rate changing from the original frame rate to the new frame rate, the Mura compensation circuit obtains a new voltage setting value corresponding to the new frame rate from the look-up table, the Mura compensation circuit controls the voltage supply circuit based on the new voltage setting value, and the voltage supply circuit dynamically adjusts the initialization voltage based on the control of the Mura compensation circuit.

23. An Mura compensation method, comprising:

obtaining a coefficient and an index value corresponding to a current frame rate of a display panel from a look-up table;

defining a first compensation area in a display panel based on a first curve equation corresponding to the current frame rate of the display panel;

calculating at least one compensation weight based on the coefficient and the index value;

compensating at least one pixel data by using the at least one compensation weight so as to generate a compensated pixel data frame;

providing the compensated pixel data frame to the display panel for displaying images;

in response to the current frame rate changing from an original frame rate to a new frame rate, obtaining a new coefficient and a new index value corresponding to the new frame rate from the look-up table;

updating the first curve equation based on the new coefficient;

calculating the at least one compensation weight in the first compensation area by using the new index value and the first curve equation; and compensating the at least one pixel data in the first compensation area by using the at least one compensation weight.

24. The Mura compensation method according to claim 23, further comprising:

calculating W=1+(x^2−C_L*(y+V))*I/C_V, wherein W is the first compensation weight, C_L is the new coefficient of the first curve equation, V is a vertical resolution of the display panel, I is the new index value, and C_V is a real coefficient related to the vertical resolution.

25. The Mura compensation method according to claim 23, further comprising:

calculating W=1+((x−H)^2−C_R*(y+V))*I/C_V, wherein W is the first compensation weight, H is a horizontal resolution of the display panel, C_R is the new coefficient of the first curve equation, V is a vertical resolution of the display panel, I is the new index value, and C_V is a real coefficient related to the vertical resolution.

26. The Mura compensation method according to claim 23, further comprising:

in response to the current frame rate changing from the original frame rate to the new frame rate, obtaining a new voltage setting value corresponding to the new frame rate from the look-up table; and controlling a voltage supply circuit based on the new voltage setting value, so as to dynamically adjust the initialization voltage to the display panel.

27. A display device, comprising:

a display panel;

a voltage supply circuit, coupled to the display panel to provide an initialization voltage; and a Mura compensation circuit, coupled to the display panel and the voltage supply circuit, wherein the Mura compensation circuit defines a compensation area in the display panel based on a curve equation corresponding to a current frame rate of the display panel, wherein in response to the current frame rate of the display panel changing from an original frame rate to a new frame rate, the Mura compensation circuit obtains a new voltage setting value, a new coefficient and a new index value corresponding to the new frame rate from a look-up table, the Mura compensation circuit controls the voltage supply circuit based on the new voltage setting value, and the voltage supply circuit dynamically adjusts the initialization voltage based on the control of the Mura compensation circuit, and wherein the Mura compensation circuit updates the curve equation based on the new coefficient, the Mura compensation circuit uses the new index value and the curve equation to calculate at least one compensation weight in the compensation area, and the Mura compensation circuit uses the at least one compensation weight to compensate at least one pixel data in the compensation area.

28. A Mura compensation method, comprising:

defining a compensation area in a display panel based on a curve equation corresponding to a current frame rate of the display panel;

in response to the current frame rate of a display panel changing from an original frame rate to a new frame rate, obtaining a new voltage setting value, a new coefficient and a new index value corresponding to the new frame rate from a look-up table;

controlling a voltage supply circuit based on the new voltage setting value, so as to dynamically adjust an initialization voltage to the display panel;

updating the curve equation based on the new coefficient;

calculating at least one compensation weight in the compensation area by using the new index value and the curve equation; and compensating at least one pixel data in the compensation area by using the at least one compensation weight.

* * * * *